United States Patent Office 3,354,875
Patented Nov. 28, 1967

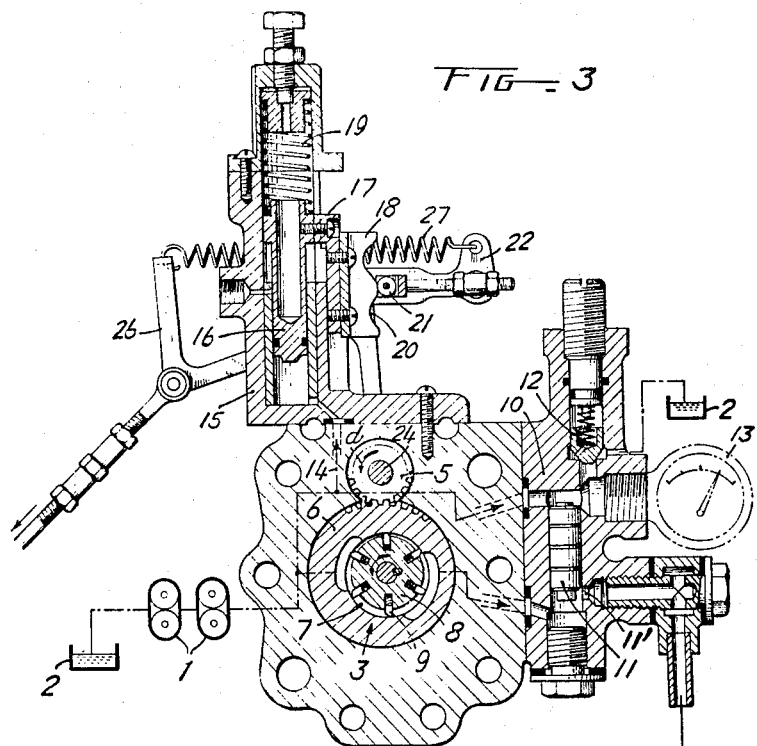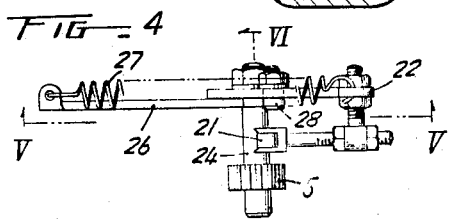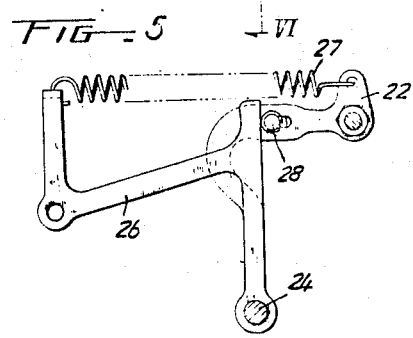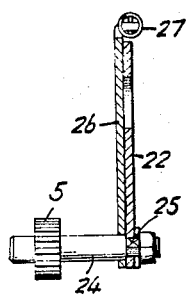

3,354,875
APPARATUS FOR ADJUSTMENT OF FUEL INJECTION AMOUNT IN INTERNAL COMBUSTION ENGINES
Ryuzo Kajikawa, Eiichi Hasimoto, and Eiji Tahara, Tokyo, Japan, assignors to Kabushiki Kaisha Honda Gijutsu Kenkyusho, Yamato-machi, Kitaadachi-gun, Saitama-ken, Japan, a corporation of Japan
Filed Mar. 12, 1965, Ser. No. 439,365
Claims priority, application Japan, Apr. 15, 1964, 39/20,989
2 Claims. (Cl. 123—140)

When a high output power increase is desired in a piston type internal combustion engine, air pulsation in the suction or exhaust system is often utilized directly. In this case, the air suction under full throttle or nearly full throttle condition in relation to the engine speed is represented as a violent pulsation characteristic.

Under this condition, the fuel injection amount, that is the injection amount per engine cycle produced by the fuel injection pump in relation to the engine speed, has a nearly horizontal characteristic although such characteristic can be changed by using a suitable kind of governor to be that of a declining tendency.

If such an engine is combined with this type of fuel injection pump, there is caused by the variations of the suction pulsation, a large difference between the suction air amount and the actual fuel injection amount. That is, the air-fuel ratio becomes non-uniform so that the expected output power increase cannot be obtained.

The present invention has for its principal object to provide an apparatus whereby the fuel injection amount per cycle can be adjusted automatically in accordance with the change of the suction air amount for avoiding the above-mentioned disadvantage of nonuniform performance.

According to the present invention, a test engine is used, and the characteristic curve of the suction air amount in relation to the engine speed under full throttle condition, is previously measured in connection with the test engine, and in operation of a similar engine corresponding to the above test engine, the fuel injection amount in relation to the engine speed under nearly full throttle condition, is adjusted in accordance with the above-mentioned characteristic curve.

One embodying example of the present invention will be described with reference to the accompanying drawings, wherein:

FIG. 3 is a sectional side view of the assembly of one embodying apparatus of the present invention, FIG. 4 is a plan view of a portion of the assembly, containing the parts associated with the cam pinion.

FIGS. 5 and 6 are sectional views taken along the lines V—V and VI—VI, respectively, of FIG. 4.

Figure 1:
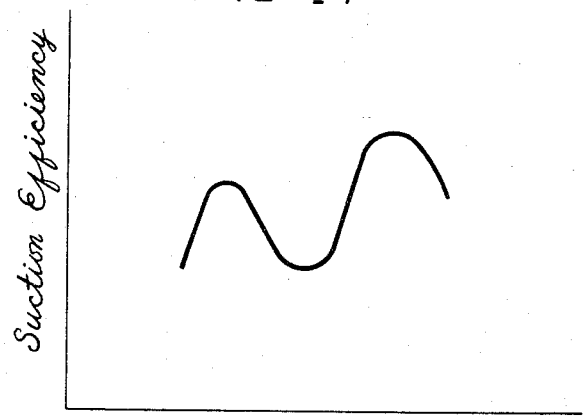
FIGS. 1 and 2 are diagrams showing variations of operating characteristics with engine speed.

Referring to the drawings, and especially FIG. 3, 1 denotes a pressure gear pump of two-stage type (front and rear) operating in connection with an internal combustion engine, and rotatably directly driven thereby; and the gear pump 1 is in communication at its suction side with a fuel tank 2, and at its discharge side is in communication with an injection nozzle 4 of the engine through a measuring vane pump 3.

The measuring vane pump 3 comprises an eccentric cam ring 6 rotatable for adjustment by the turning of a pinion 5, an eccentric hollow chamber 7 of a cam ring 6, and a rotor 8 rotating with the rotation of the engine at an eccentric position within the chamber 7, so that the discharge amount, that is, the injection amount per cycle from the injection nozzle 4, can be adjusted at will by the adjustment of the eccentricity in the vertical direction of the hollow chamber 7 in relation to the rotor 8 of vane pump 3, by properly turning the cam ring 6 by the pinion 5. An arrow $d$ shows the increasing direction.

FIG. 1 shows a violent pulsation characteristic of the air suction applied under full throttle.

Figure 2:
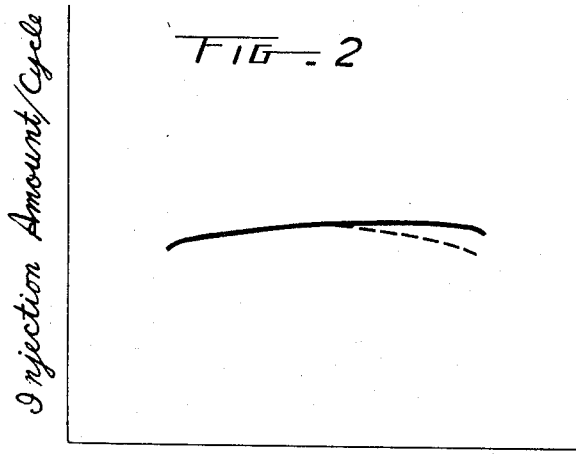

FIG. 2 shows the nearly horizontal characteristics of the injection amount per cycle in relation to the engine speed.

In FIG. 3, 9 denotes radially extending vanes carried by the rotor 8, and 10 denotes a pressure balance valve interposed between the suction side and the discharge side of the measuring vane pump 3, 11 denotes a free piston within the same, and 11' denotes its valve opening. The suction side of vane pump 3 is in communication at its suction side through a relief valve 12 with the fuel tank 2. 13 denotes a pressure gauge.

A branch channel 14, which is provided on the discharge side of the pressure gear pump 1, is connected and open to the lower portion of an oil pressure cylinder 15, and a vertically movable piston 16 within the same is provided with a control cam 18 through an outwardly projecting arm 17, so that the control cam 18 may be moved upwardly and downwardly in accordance with the discharge pressure of the pressure gear pump 1, that is, the speed of the engine driving the pump. 19 denotes a spring for urging the piston 16 downward.

The characteristic curve of the suction air amount per cycle in relation to the engine speed under full throttle condition, is previously measured in connection with a similar test internal combustion engine, and the cam surface 20 of the control cam 18 is contoured into a curved surface similar to the curve of the characteristic curve thus measured. A cam follower 21 engaging with cam surface 20 is fixed to the front end of a swingable arm 22, of which the other end is mounted on a square axial portion 25 (FIG. 6), formed at the end of a spindle 24 of the pinion 5, so that in accordance with the upward and downward movement of the control cam 18, the pinion 5 is given rightward and leftward turning movement through swingable arm 22, whereby the increase and decrease in the discharge amount of the vane pump 3 may be adjusted.

26 denotes a throttle lever operating with the opening and closing of the throttle valve (not shown), and the lever 26 is mounted rotatably at its bottom end on the spindle 24 of the pinion 5. The lever 26 and the swingable arm 22 are pulled together at their top ends by a spring 27, and the swingable arm 22 is provided with a stopper pin 28 to engage with the rear side of the throttle lever 26, so that under the condition shown in FIG. 4, the arm 22 is controlled by the pin 28 to incline forwardly, that is, leftward in the drawings.

If, however, from this condition, the throttle lever 26 is inclined forwardly under full throttle or nearly full throttle condition, the arm 22 is released from the prevention of forward inclination movement by the lever 26, and is given forward inclination force through the spring 27, so that the cam follower 21 is brought into contact under pressure with the cam surface 20 of the control cam 18 so that it is possible to follow the same freely.

The operation of the apparatus will now be described:

If the speed of the engine is gradually increased by gradually opening the throttle valve, the discharge pressure of the pressure gear pump 1 rotating with the engine and directly driven thereby, is gradually increased in accordance therewith, and this pressure is conducted into the interior of the oil pressure cylinder 15 for acting on the piston 16, whereby the piston 16 is moved upwardly together with its outer surface control cam 18. When the throttle valve reaches its nearly full open condition, the cam 18 reaches the position where it is in registration with the cam follower 21, and at that position the cam moves upwardly and downwardly in accordance with the increase and decrease of the engine speed. In this case, the lever 26 is inclined forwardly and the swingable arm 22 is released from the restriction by the throttle lever 26 to be inclined forwardly through the spring 27, and the cam follower 21 is brought into engagement under pressure with the cam surface 20 of the control cam 18.

Therefore, in accordance with this upward and downward movement of the cam 18, the cam follower 21 moves forwardly and rearwardly in accordance with the concaves and convexes of the cam surface 20, whereby through the swingable lever 22 and the pinion 5, the measuring vane pump 3 may be adjusted to increase or decrease the discharge amount thereof. Consequently, in nearly full throttle condition, the fuel injection amount per cycle from the injection nozzle 4 is varied in accordance with the shape of the cam surface 20 according to the increase and decrease of the engine speed. In other words, there can be obtained a change which is in accordance with the previously measured characteristic curve in connection with a test engine, that is the changing characteristic feature of the suction air amount per cycle in relation to the engine speed in full throttle condition.

In the embodiment shown in the drawings, the speed of the engine is measured as the discharge pressure in the pressure gear pump 1, and under this pressure the control cam is moved upwardly and downwardly. However, this can be modified so that the engine speed is measured as a centrifugal force by means of, for example, a governor and the like, and by utilizing this the control cam is moved, for example, by means of a rack and pinion mechanism. In the embodiment shown in the drawings, furthermore, a measuring vane pump of the type wherein the eccentricity is adjustable, is used as a control valve for the injection amount, but other types can be satisfactorily used for this purpose.

According to the present invention, as described above, the characteristic curve of the suction air amount in relation to the engine speed under full throttle condition, is previously measured in connection with a similar test engine, and in the operation of a corresponding engine the adjustment of the fuel injection amount in relation to the engine speed is effected on the basis of this characteristic curve, so that the fuel injection amount and the suction air amount are changed analogously one to another, and this is very useful for the increase in the engine output power.

I claim:
1. In apparatus for adjusting the fuel injection amount per cycle for an internal combustion engine, a fuel vane pump having an adjustably eccentrically mounted rotor, a fuel injection nozzle connected to the output of said vane pump, said vane pump being driven synchronously with said engine, a pressure gear pump having its output connected to the input of said rotary vane pump, an oil pressure cylinder, a piston slidably mounted in said cylinder, said cylinder being connected to the discharge side of said pressure gear pump, a slidable cam surface connected to said piston, cam follower means engageable with said cam surface, and means actuated by said cam follower means and adapted to vary the eccentrically of the rotor of said fuel vane pump, whereby the fuel injection amount per cycle is adjusted in accordance with the contour of said cam surface.

2. In apparatus for adjusting the fuel injection amount per cycle for an internal combustion engine, a fuel vane pump having an adjustably eccentrically mounted rotor, a fuel injection nozzle connected to the output of said vane pump, said vane pump being driven synchronously with said engine, a pressure gear pump having its output connected to the input of said rotary vane pump, an oil pressure cylinder, a piston slidably mounted in said cylinder, said cylinder being connected to the discharge side of said pressure gear pump, a slidable cam surface connected to said piston, cam follower means engageable with said cam surface, and means actuated by said cam follower means and adapted to vary the eccentricity of the rotor of said fuel vane pump, whereby the fuel injection amount per cycle is adjusted in accordance with the contour of said cam surface, said cam surface corresponding to the plotted measured characteristic of suction air amount in relation to engine speed under full throttle of the engine.

References Cited
UNITED STATES PATENTS

| 2,400,415 | 5/1946 | Hersey | 123—119 X |
| 2,670,724 | 3/1954 | Reggio | 123—119 X |
| 2,949,903 | 8/1960 | Dietrich | 123—119 |
| 3,140,702 | 7/1964 | Fishman et al. | 123—140.1 |

FOREIGN PATENTS

| 408,760 | 4/1934 | Great Britain. |
| 718,396 | 11/1954 | Great Britain. |

LAURENCE M. GOODRIDGE, *Primary Examiner.*